United States Patent
Barak et al.

(10) Patent No.: US 7,962,539 B2
(45) Date of Patent: Jun. 14, 2011

(54) SYSTEM, METHOD AND DEVICE OF GENERATING A RANDOM VALUE

(75) Inventors: Assaf Barak, Haifa (IL); Eli Bloch, Rosh-Haain (IL); Elazar Kachir, Tel-Aviv (IL); Anastasia Ester Kapchits, Yokneam (IL); Oded Katz, Haifa (IL); Moshe Leibowitz, Haifa (IL); Dan Ramon, Yokne'am Hit (IL); Israel A. Wagner, Zichron-Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 11/742,002

(22) Filed: Apr. 30, 2007

(65) Prior Publication Data

US 2008/0270502 A1 Oct. 30, 2008

(51) Int. Cl.
G06F 1/02 (2006.01)
(52) U.S. Cl. .................................................. 708/250
(58) Field of Classification Search .................. None
See application file for complete search history.

(56) References Cited

U.S. PATENT DOCUMENTS

| | | | |
|---|---|---|---|
| 5,224,165 A * | 6/1993 | Reinhardt et al. | 380/47 |
| 5,871,400 A | 2/1999 | Yfantis | |
| 6,061,702 A * | 5/2000 | Hoffman | 708/251 |
| 6,218,973 B1 | 4/2001 | Barrett et al. | |
| 6,253,223 B1 | 6/2001 | Sprunk | |
| 6,512,405 B1 | 1/2003 | Lundberg | |
| 6,763,364 B1 | 7/2004 | Wilber | |
| 6,792,438 B1 | 9/2004 | Wells et al. | |
| 6,813,625 B2 * | 11/2004 | Smeets | 708/250 |
| 6,954,770 B1 | 10/2005 | Carlson et al. | |
| 7,007,060 B2 * | 2/2006 | Miller, Jr. | 708/801 |
| 7,028,059 B2 * | 4/2006 | Williams | 708/250 |
| 7,702,704 B2 * | 4/2010 | Muranaka | 708/250 |
| 2005/0097153 A1 * | 5/2005 | Dirscherl et al. | 708/250 |

OTHER PUBLICATIONS

Lim et al., "Exploiting Metastability and Thermal Noise to Build a Re-Configurable Hardware Random Number Generator", Proceedings of SPIE—The International Society for Optical Engineering, v 5844, Noise in Devices and Circuits III, 2005, pp. 294-309.
Callegari et al., "First Direct Implementation of a True Random Source on Programmable Hardware", International Journal of Circuit Theory and Applications, v 33, n1, Jan./Feb. 2005, pp. 1-16.
W.T. Penzhorn, "Design of a Truly Random Monolithic Noise Generator", Microelectronics Journal, v 15, n 4, Jul.-Aug. 1984, pp. 29-40.
C.S. Petrie et al., "A Noise-Based IC Random Number Generator for Applications in Cryptography", IEEE Transactions on Circuits and Systems I: Fundamental Theory and Applications, v 47, n 5, May 2000, pp. 615-621.
Yalcin et al. "True Random Bit Generation from a Double-Scroll Attractor", IEEE Transactions on Circuits and Systems I: Regular Papers, v 51, n 7, 2004, pp. 1395-1404.
Johansson et al., "Random Number Generation by Chaotic Double Scroll Oscillator on Chip", IEEE International Symposium on Circuits and Systems, v 5, 1999, pp. V-407-V-409.

* cited by examiner

*Primary Examiner* — David H Malzahn
(74) *Attorney, Agent, or Firm* — Suzanne Erez (57) ABSTRACT

Some demonstrative embodiments of the invention include a method, apparatus and system of generating a random number. A random number generator may include, for example, a plurality of different random-number-generation modules adapted to generate random bits at a plurality of bit paths; and a combiner adapted to combine the bits of the plurality of paths. Other embodiments are described and claimed.

20 Claims, 7 Drawing Sheets

SYSTEM, METHOD AND DEVICE OF GENERATING A RANDOM VALUE

Some demonstrative embodiments of the invention relate to the field of random number generation.

BACKGROUND OF THE INVENTION

A random number generator (RNG) may include a computational or physical device designed to generate a sequence of values that may be treated as random, e.g., an unpredictable sequence of statistically independent numbers. That is, knowledge of a previously generated number may not add knowledge regarding the next generated number. A RNG may be implemented for diverse applications, for example, in the fields of cryptography, computer simulations, statistical sampling, etc. For example, the RNG may be used for the creation of cryptographic keys in a secure communication system, for initialization sequences ("seeds") in random algorithms, in spread-spectrum signaling, or for applications that use stochastic simulation methods, e.g., Monte-Carlo.

In many cryptographic systems, it may be required to integrate the RNG on chip, e.g., in order to make it hard to tamper with the RNG and/or in order to simplify a fabrication process.

A Pseudo RNG (PRNG) may have a periodic signal over large cycles and may be mathematically predictable. The PRNG may be used, for example, when randomness requirements are not very rigorous. However, in most security applications a True RNG (TRNG) may be required.

SUMMARY OF THE INVENTION

Some demonstrative embodiments of the invention include a method, apparatus and system of generating a random number.

According to some demonstrative embodiments of the invention, a random number generator may include a plurality of different random-number-generation modules adapted to generate random bits at a plurality of bit paths; and a combiner adapted to combine the bits of the plurality of paths. The random number generator may generate a random value based, for example, on an output of the combiner.

According to some demonstrative embodiments of the invention, a method of generating a random number may include generating bits at a plurality of bit paths of a plurality of random-number-generation modules; and combining bits of the plurality of bit paths, e.g., to generate one or more bits at a combined path based on the bits of the plurality of bit paths.

According to some demonstrative embodiments of the invention, a chip may include a random number generator to generate an output value, the random number generator including a plurality of different random-number-generation modules adapted to generate random bits at a plurality of bit paths; and a combiner adapted to combine the bits of the plurality of paths, wherein the output value is based on an output of the combiner. The chip may also include a processor to process the random value.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings in which:

FIG. 7 is a schematic flow-chart illustration of a method of generating a random value in accordance with some demonstrative embodiments of the invention It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that embodiments of the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, a plurality of bit paths may include two or more bit paths.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Figure 1:
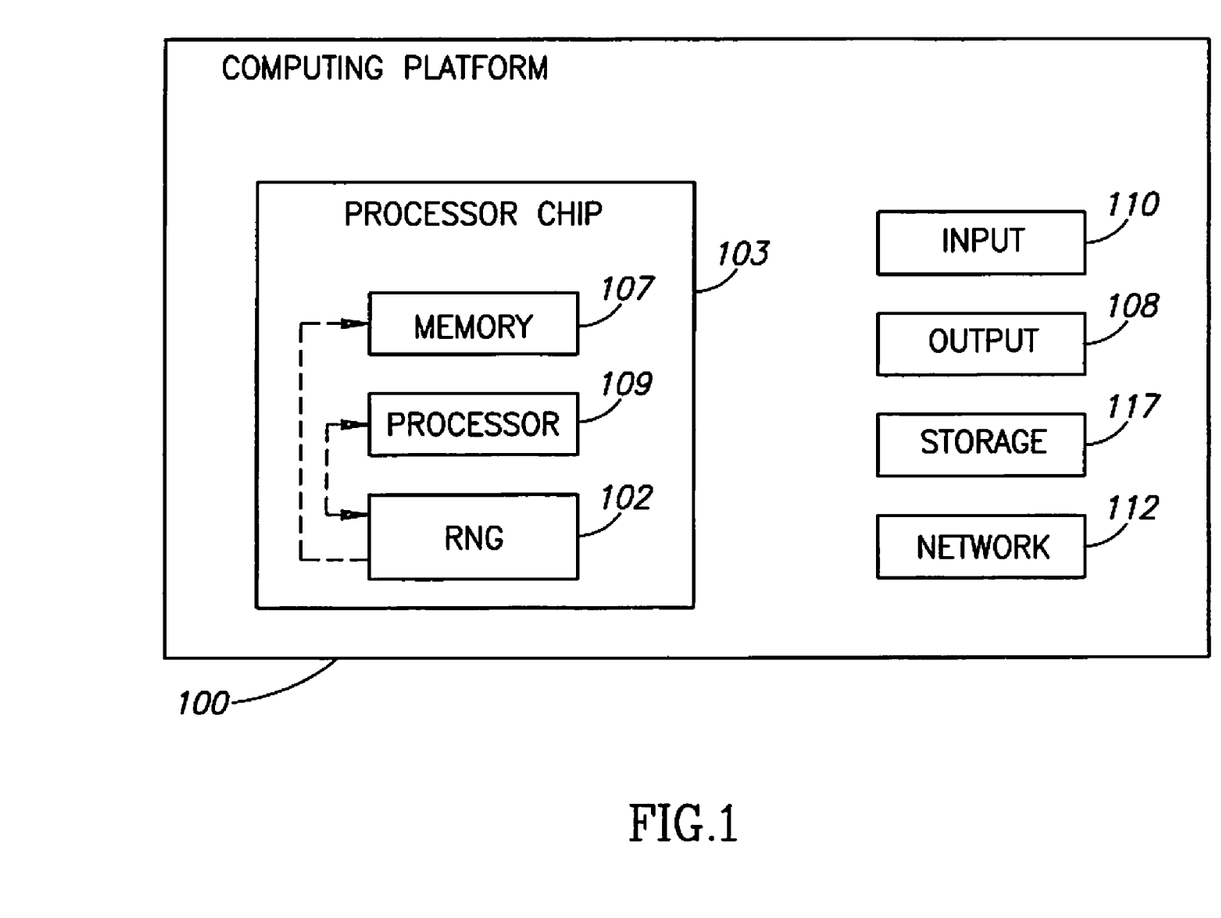
FIG. 1 is a schematic diagram of a computing platform including a Random Number Generator (RNG) in accordance with some demonstrative embodiments of the present invention.

Reference is now made to FIG. 1, which schematically illustrates a computing platform 100 according to some demonstrative embodiments of the invention.

Although the present invention is not limited in this respect, computing platform 100 may be a portable device. Non-limiting examples of such portable devices include mobile telephones, laptop and notebook computers, personal digital assistants (PDA), memory cards, memory units, and the like. Alternatively, the computing platform may be a non-portable device, such as, for example, a desktop computer.

According to some demonstrative embodiments of the invention, computing platform 100 may include a Random Number Generator (RNG) 102 to generate one or more output bits representing a value, e.g., a value intended to be substantially random, as described in detail below.

According to some demonstrative embodiments of the invention, RNG 102 may include an on-chip RNG, e.g., integrated as part of a chip. For example, RNG 102 may be implemented as part of a processor chip 103. Processor chip 103 may include any suitable chip architecture and/or configuration.

Although the invention is not limited in this respect, processor chip 103 may include or may be a secure processor chip adapted to perform one or more secure operations. For example, processor chip 103 may include any suitable protection mechanism, e.g., any suitable "physical" protection structure and/or any other suitable protection configuration as is known in the art, to prevent the disclosure of any part of the contents of chip 103, to prevent any attempt to access any part of the contents of chip 103, to prevent any attempt to tamper or alter the contents of chip 103, in part or in whole, and/or to prevent any attempt to interfere with the operation of chip 103.

According to some demonstrative embodiments, processor chip 103 may include a cryptographic processor chip adapted to perform one or more cryptographic operations. Processor chip 103 may include, for example, a memory 107 and/or a processor 109. Processor 109 may include, for example, a Central Processing Unit (CPU), a Digital Signal Processor (DSP), a microprocessor, a plurality of processors, a controller, or any other suitable multi-purpose or specific processor or controller, e.g., as are known in the art. Memory 107 may include, for example, a Random Access Memory (RAM), a Read Only Memory (ROM), a Flash memory, a volatile memory, a non-volatile memory, a cache memory, a buffer, a short term memory unit, a long term memory unit, or other suitable memory units or storage units.

According to some demonstrative embodiments of the invention, the output bits generated by RNG 102 may be provided to processor 109 and/or memory 107. For example, processor 109 may process one or more of the output bits generated by RNG 102, e.g., as part of a decryption and/or encryption operation, as known in the art. Additionally or alternatively, one or more of the output bits of RNG 102 may be stored by memory 107.

Some demonstrative embodiments of the invention are described herein with reference to an RNG, e.g., RNG 102, integrated on a chip, e.g., chip 103. However, it will be appreciated by those skilled in the art that the invention is not limited in this respect, and that in other embodiments of the invention the chip and RNG may be implemented as separate elements of a computing platform.

In some demonstrative embodiments of the invention, platform 100 may optionally include an output unit 108, an input unit 110, a network connection 112, a storage 117, and/or any other suitable hardware components and/or software components.

According to some demonstrative embodiments of the invention, input unit 110 may include, for example, a keyboard, a mouse, a touch-pad, or other suitable pointing device or input device. Output unit 108 may include, for example, a Cathode Ray Tube (CRT) monitor, a Liquid Crystal Display (LCD) monitor, or other suitable monitor or display unit. Storage 117 may include, for example, a hard disk drive, a floppy disk drive, a Compact Disk (CD) drive, a CD-Recordable (CD-R) drive, or other suitable removable and/or fixed storage unit. Network connection 112 may be adapted to interact with a communication network, for example, a local area network (LAN), wide area network (WAN), or a global communication network, for example, the Internet. According to some embodiments the communication network may include a wireless communication network such as, for example, a wireless LAN (WLAN) communication network. Although the scope of the present invention is not limited in this respect, the communication network may include a cellular communication network, with platform 100 being, for example, a base station, a mobile station, or a cellular handset. The cellular communication network, according to some embodiments of the invention, may be a $3^{rd}$ Generation Partnership Project (3GPP), such as, for example, Frequency Domain Duplexing (FDD), Global System for Mobile communications (GSM), Wideband Code Division Multiple Access (WCDMA) cellular communication network and the like.

Figure 2:
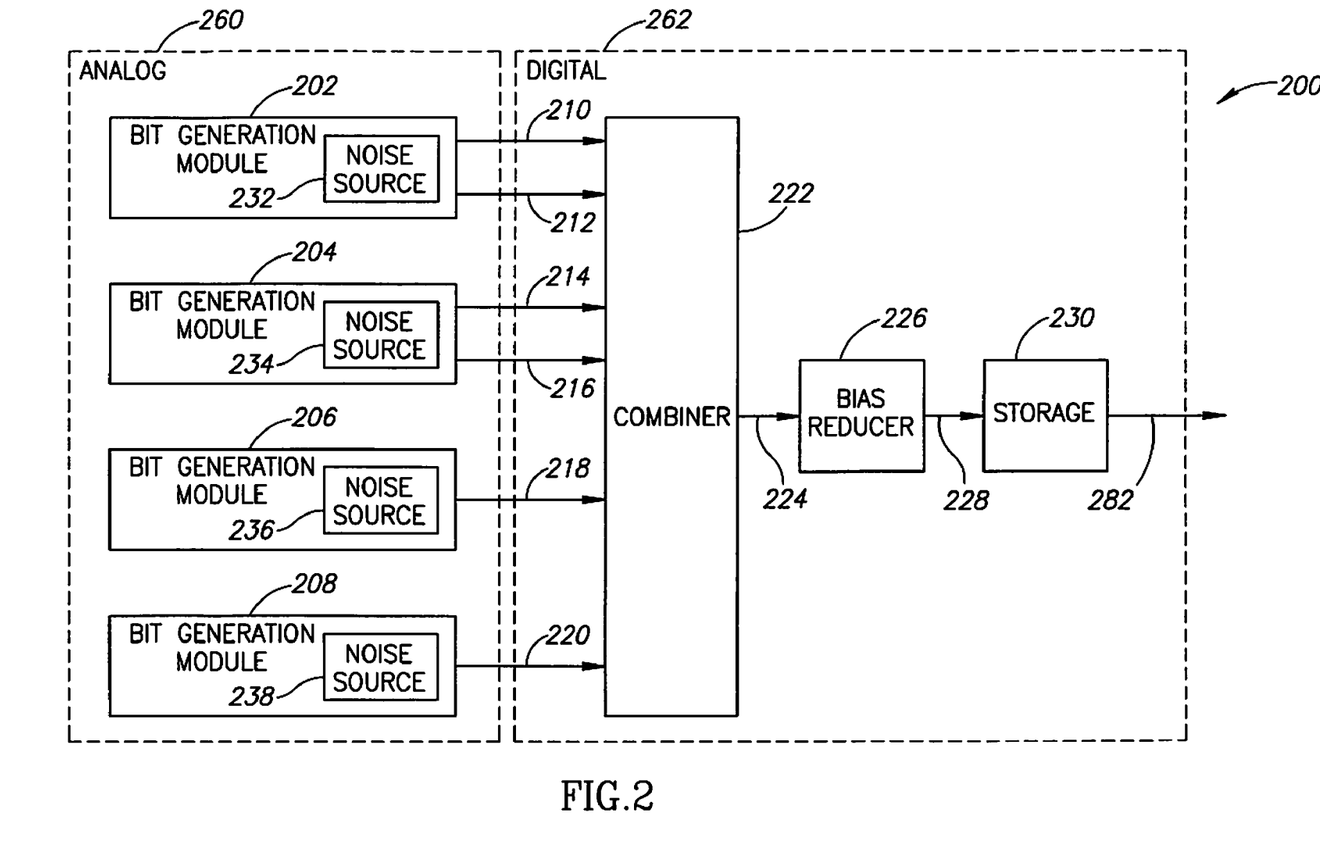
FIG. 2 is a schematic diagram of a RNG in accordance with some demonstrative embodiments of the invention.

Reference is now made to FIG. 2, which schematically illustrates a RNG 200 according to some demonstrative embodiments of the invention. Although the invention is not limited in this respect, in some demonstrative embodiments RNG 200 may perform the functionality of RNG 102 (FIG. 1).

According to some demonstrative embodiments of the invention, RNG 200 may include a plurality of RNG modules to generate random bits at a plurality of random bit paths. For example, each of the RNG modules may independently generate random bits at one or more of the plurality of bit paths, e.g., as described in detail below. The plurality of RNG modules may include, for example, a plurality of different RNG modules, e.g., as described below.

Although the invention is not limited in this respect, according to some demonstrative embodiments of the invention, RNG 200 may include, for example, four, different, RNG modules to generate random bits at six bit paths. For example, RNG 200 may include a RNG module 202 to generate random bits at bit paths 210 and 212, a RNG module 204 to generate random bits at bit paths 214 and 216, a RNG module 206 to generate random bits at a bit path 218, and a RNG module 208 to generate random bits at a bit path 220, as described in detail below.

Although some demonstrative embodiments of the invention are described herein with reference to an RNG, e.g., RNG 200, including four RNG modules to generate random bits at six bit paths, it will be appreciated by those of ordinary skill in the art that in other embodiments of the invention the RNG may include any other suitable plurality of RNG modules to generate random bits at a plurality of bit paths. In on example, the RNG may only include a plurality of RNG modules, e.g., modules 206 and/or 208, each able to generate bits at a single bit path. In another example, the RNG may only include a plurality of RNG modules, e.g., modules 202 and/or 204, each able to generate bits at two bit paths. In further example, the RNG may include any other suitable combination of modules 202, 204, 206 and 208, and/or any other RNG modules.

According to some demonstrative embodiments of the invention, each of RNG modules 202, 204, 206, and 208 may be adapted to generate the random bits at the one or more corresponding bit paths independently of the other RNG modules. For example, each of RNG modules 202, 204, 206 and 208 may include at least one noise source, e.g., as described in detail below. Bits of bit paths 210 and 212 may be generated, for example, based on noise signals of at least one noise source 232; bits of bit paths 214 and 216 may be generated, for example, based on noises signal of at least one noise source 234; bits of bit path 218 may be generated, for example, based on noise signals of at least one noise source 236; and/or bits of bit path 220 may be generated, for example, based on noise signals of at least one noise source 238. Noise sources 232, 234, 236 and 238 may include any suitable noise source. In some demonstrative embodiments, noise sources 232, 234, 236 and 238 may include analog noise sources, e.g., a thermal noise amplifier and/or a chaotic noise generator, as described in detail below.

According to some demonstrative embodiments of the invention, each of RNG modules 202, 204, 206 and 208 may differ from the other RNG modules in a type of the at least one noise source, in one or more other elements, e.g., a noise spreader, an/or an arrangement of the at least one noise source and the other elements, e.g., as described below.

According to some demonstrative embodiments of the invention, RNG module 202 may be adapted to generate the bits at bit path 210 using, for example, an active thermal noise source, a chaotic noise source, and a spectrum spreader; and/or the bits of path 212, using the active thermal noise source and the chaotic noise source, e.g., as described below with reference to FIG. 3.

According to some demonstrative embodiments of the invention, RNG module 204 may be adapted to generate the bits of bit path 214 using, for example, a chaotic noise source and a spectrum spreader; and/or the bits of path 216, using the chaotic noise source, e.g., as described below with reference to FIG. 4.

According to some demonstrative embodiments of the invention, RNG module 206 may be adapted to generate the bits of bit path 218 using, for example, an active thermal noise source and a spectrum spreader, e.g., as described below with reference to FIG. 5.

According to some demonstrative embodiments of the invention, RNG module 208 may be adapted to generate the bits of bit path 220 using, for example, an active noise source and a voltage comparator, e.g., as described below with reference to FIG. 6.

It will be appreciated by persons skilled in the art, that each RNG modules 202, 204, 206, and 208 may generate random bits over at least one bit path, e.g., independently of the other RNG modules.

According to some demonstrative embodiments of the invention, RNG 200 may also include a combiner 222 to generate one or more bits at a bit path 224 based on a combination of bits received over bit paths 210, 212, 214, 216, 218 and/or 220. Although the invention is not limited in this respect, combiner 222 may include an exclusive-or (XOR) gate to perform a logical XOR operation on the bits received from bit paths 210, 212, 214, 216, 218, and 220. Accordingly, combiner 222 may generate random bits at bit path 224 based on bits received from at least one of bit paths 210, 212, 214, 216, 218, and 220. Therefore, combiner 222 may generate random bits at bit path 224, e.g., even if bits are received from only some of bit paths 210, 212, 214, 216, 218, and 220.

According to some demonstrative embodiments of the invention, RNG 200 may optionally include a bias reducer 226 and/or storage 230. Bias reducer 226 may include any suitable bias reducer adapted to reduce or eliminate a bias between the random bits of path 224. For example, bias reducer 226 may include any suitable filter, e.g., a Von-Neumann filter as is known in the art. Storage 230 may include any suitable storage or queue, e.g., a First-In-First-Out (FIFO) queue, to maintain output bits of combiner 222 and/or bias reducer 226.

According to some demonstrative embodiments of the invention, an output 282 of RNG 200 may include one or more random bits retrieved from storage 230. Alternatively, output 282 may include bits received from an output of bias reducer 226, e.g., if RNG 200 does not include storage 230; or bits received from bit path 224, e.g., if RNG 200 does not include bias reducer 226.

Figure 3:
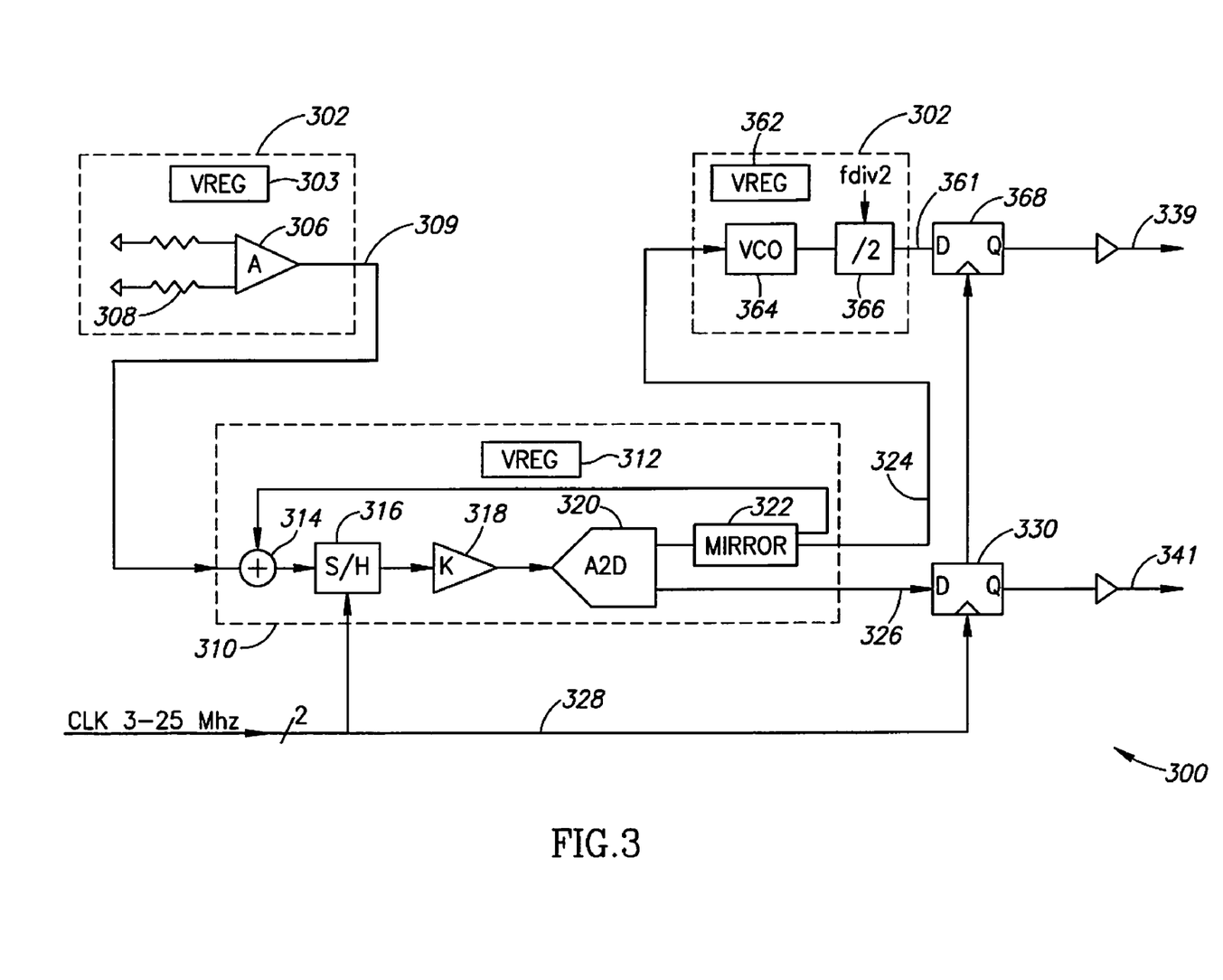
FIG. 3 is a schematic illustration of a RNG module in accordance with one demonstrative embodiment of the invention.

Reference is now made to FIG. 3, which schematically illustrates a RNG module 300 adapted to generate random bits at a first bit path 339, and a second bit path 341, according to one demonstrative embodiment of the invention. Although the invention is not limited in this respect RNG module 300 may perform the functionality of RNG module 202 (FIG. 2). For example, bit paths 210 and 212 (FIG. 2) may include bit paths 339 and 341, respectively.

According to some demonstrative embodiments of the invention, RNG module 300 may include an active thermal noise source 302 to generate a noise signal 309. Noise source 302 may include any suitable active thermal noise source, e.g., as is known in the art. In one example, noise source 302 may include a thermal noise source 308, e.g., including a Metal-Oxide Semiconductor (MOS) arrangement, to generate a thermal noise signal, as is known in the art; and an amplifier 306 to amplify the thermal noise signal, e.g., as is known in the art.

According to some demonstrative embodiments of the invention, RNG module 300 may also include a chaotic noise source 310 to generate an analog noise signal 324 and a digital noise signal 326, e.g., based on noise signal 309. Chaotic noise source 310 may include any suitable chaotic noise source, e.g., as is known in the art. In one example, chaotic noise source 310 may include an adder 314 to combine noise signal with an output of a mirror 322. Chaotic noise source 310 may also include a sample and hold element (S/H) 316 to sample an output of adder 314 based on a clock signal 328; an amplifier 318 to amplify an output of S/H 316, an analog to digital converter 320 to convert an output of amplifier 318, and mirror 322 to generate noise signal 324, based on an output of converter 320.

According to some demonstrative embodiments of the invention, RNG module 300 may also include a spectrum spreader 360 to spread a spectrum of noise signal 324. Spreader 360 may include any suitable spectrum spreader, e.g., as is known in the art. In one example, spreader 360 may include a Voltage Controlled Oscillator (VCO) 364, e.g., as is well known in the art, and a divider by two 366.

According to some demonstrative embodiments of the invention, RNG module 300 may also include a flip-flop 330 to generate random bits at bit path 341 based on noise signal 326 and clock signal 328. RNG module 300 may also include a flip flop 368 to generate random bits at bit path 339 based on an output 361 of spreader 360 and clock signal 328, which may be received, for example, via flip flop 330.

According to some demonstrative embodiments of the invention, one or more of thermal noise source 302, chaotic noise source 310 and/or spreader 360 may include an independent Voltage Regulator (VREG). For example, thermal noise source 302 may include a VREG 303, chaotic noise source 310 may include a VREG 312, and/or spreader 360 may include a VREG 362. VREGs 303, 312, and/or 362 may include any suitable VREG. For example, VREGs 303, 312, and/or 362 may include an on-chip bandgap reference based VREG, e.g., having a predefined Power Supply Rejection Ratio (PSRR), as is known in the art. It will be appreciated, that VREGs 303, 312 and/or 362 may reduce the affect of on-chip cyclostationary noise and/or external modulations on the operation of RNG 300.

Figure 4:
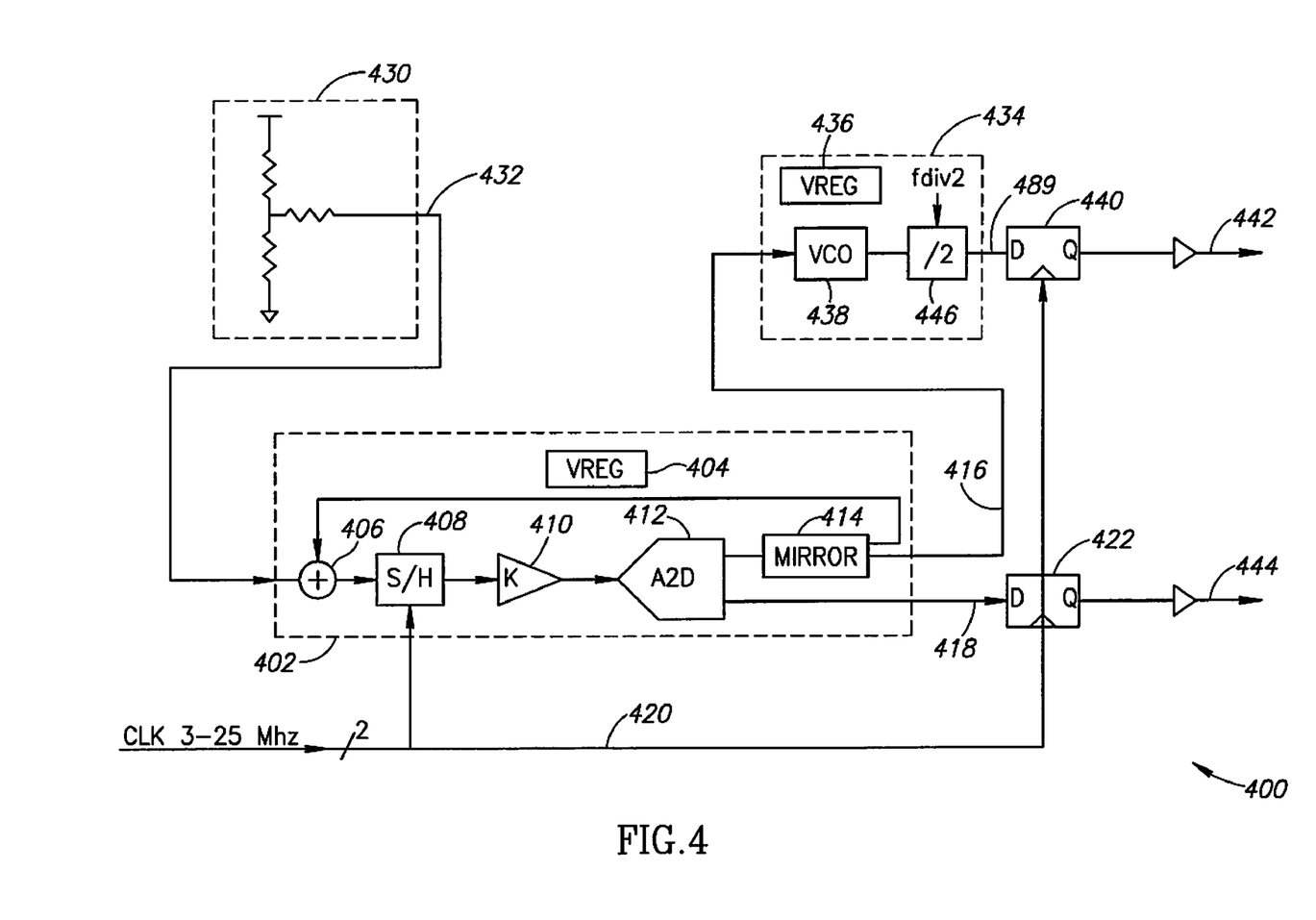
FIG. 4 is a schematic illustration of a RNG module in accordance with another demonstrative embodiment of the invention.

Reference is now made to FIG. 4, which schematically illustrates a RNG module 400 adapted to generate random bits at a first bit path 442, and a second bit path 444, according to another demonstrative embodiment of the invention. Although the invention is not limited in this respect RNG module 400 may perform the functionality of RNG module 204 (FIG. 2). For example, bit paths 214 and 216 (FIG. 2) may include bit paths 442 and 444, respectively.

According to some demonstrative embodiments of the invention, RNG module 400 may include a chaotic noise source 402 to generate an analog noise signal 416 and a digital noise signal 418, e.g., based on a noise signal 432. Chaotic noise source 402 may include any suitable chaotic noise source, e.g., as is known in the art. For example, chaotic noise source 402 may include an adder 406, a S/H 408, an amplifier 410, an analog to digital converter 412, and a mirror 414, as are described above with reference to FIG. 3.

According to some demonstrative embodiments of the invention, RNG module 400 may also include a passive thermal noise source 430 to generate noise signal 432. Noise source 430 may include any suitable passive thermal noise source, e.g., a MOS arrangement, as is known in the art.

According to some demonstrative embodiments of the invention, RNG module 400 may also include a spectrum spreader 434 to spread a spectrum of noise signal 416. Spreader 434 may include any suitable spreader, e.g., as is known in the art. For example, spreader 434 may include a VCO 438, e.g., as is well known in the art, and a divider by two 446.

According to some demonstrative embodiments of the invention, RNG module 400 may also include a flip-flop 422 to generate random bits at bit path 444 based on noise signal 418 and a clock signal 420. RNG module 400 may also include a flip flop 440 to generate random bits at bit path 442 based on an output 489 of spreader 434 and clock signal 420, which may be received, for example, via flip flop 422.

According to some demonstrative embodiments of the invention, chaotic noise source 402 and/or spreader 434 may include an independent VREG. For example, chaotic noise source 402 may include a VREG 404, and/or spreader 434 may include a VREG 436. VREGs 404 and/or 436 may include any suitable VREG. For example, VREGs 404 and/or 436 may include an on-chip bandgap reference based VREG, e.g., having a predefined PSRR as is known in the art. It will be appreciated, that VREGs 404 and/or 436 may reduce the affect of on-chip cyclostationary noise and/or external modulations on the operation of RNG 400.

Figure 5:
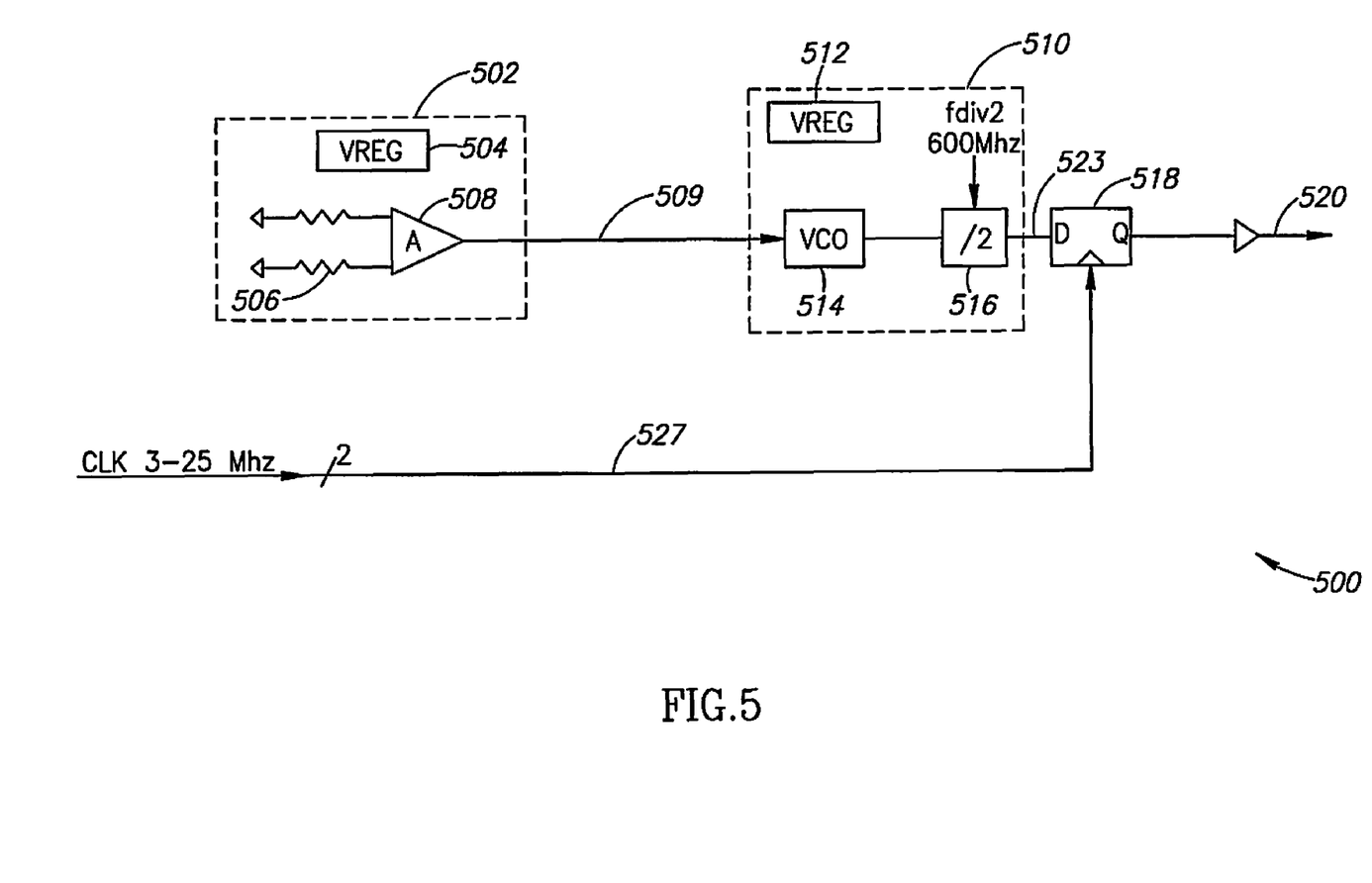
FIG. 5 is a schematic illustration of a RNG module in accordance with yet another demonstrative embodiment of the invention.

Reference is now made to FIG. 5, which schematically illustrates a RNG module 500 adapted to generate random bits at a bit path 520 according to yet another demonstrative embodiment of the invention. Although the invention is not limited in this respect RNG module 500 may perform the functionality of RNG module 206 (FIG. 2). For example, bit path 218 (FIG. 2) may include bit path 520.

According to some demonstrative embodiments of the invention, RNG module 500 may include an active thermal noise source 502 to generate a noise signal 509. Noise source 502 may include any suitable active thermal noise source, e.g., as is known in the art. In one example, noise source 502 may include a thermal noise source 506, e.g., including a MOS arrangement, to generate a thermal noise signal, as is known in the art; and an amplifier 508 to amplify the thermal noise signal, e.g., as is known in the art.

According to some demonstrative embodiments of the invention, RNG module 500 may also include a spectrum spreader 510 to spread a spectrum of noise signal 509. Spreader 510 may include any suitable spreader, e.g., as is known in the art. For example, spreader 510 may include a VCO 514, e.g., as is well known in the art, and a divider by two 516.

According to some demonstrative embodiments of the invention, RNG module 500 may also include a flip-flop 518 to generate random bits at bit path 520 based on noise signal an output 523 of spreader 510 and a clock signal 527.

According to some demonstrative embodiments of the invention, noise source 502 and/or spreader 510 may include an independent VREG. For example, noise source 502 may include a VREG 504, and/or spreader 510 may include a VREG 512. VREGs 504 and/or 512 may include any suitable VREG. For example, VREGs 504 and/or 512 may include an on-chip bandgap reference based VREG, e.g., having a predefined PSRR as is known in the art. It will be appreciated, that VREGs 504 and/or 512 may reduce the affect of on-chip cyclostationary noise and/or external modulations on the operation of RNG 500.

Figure 6:
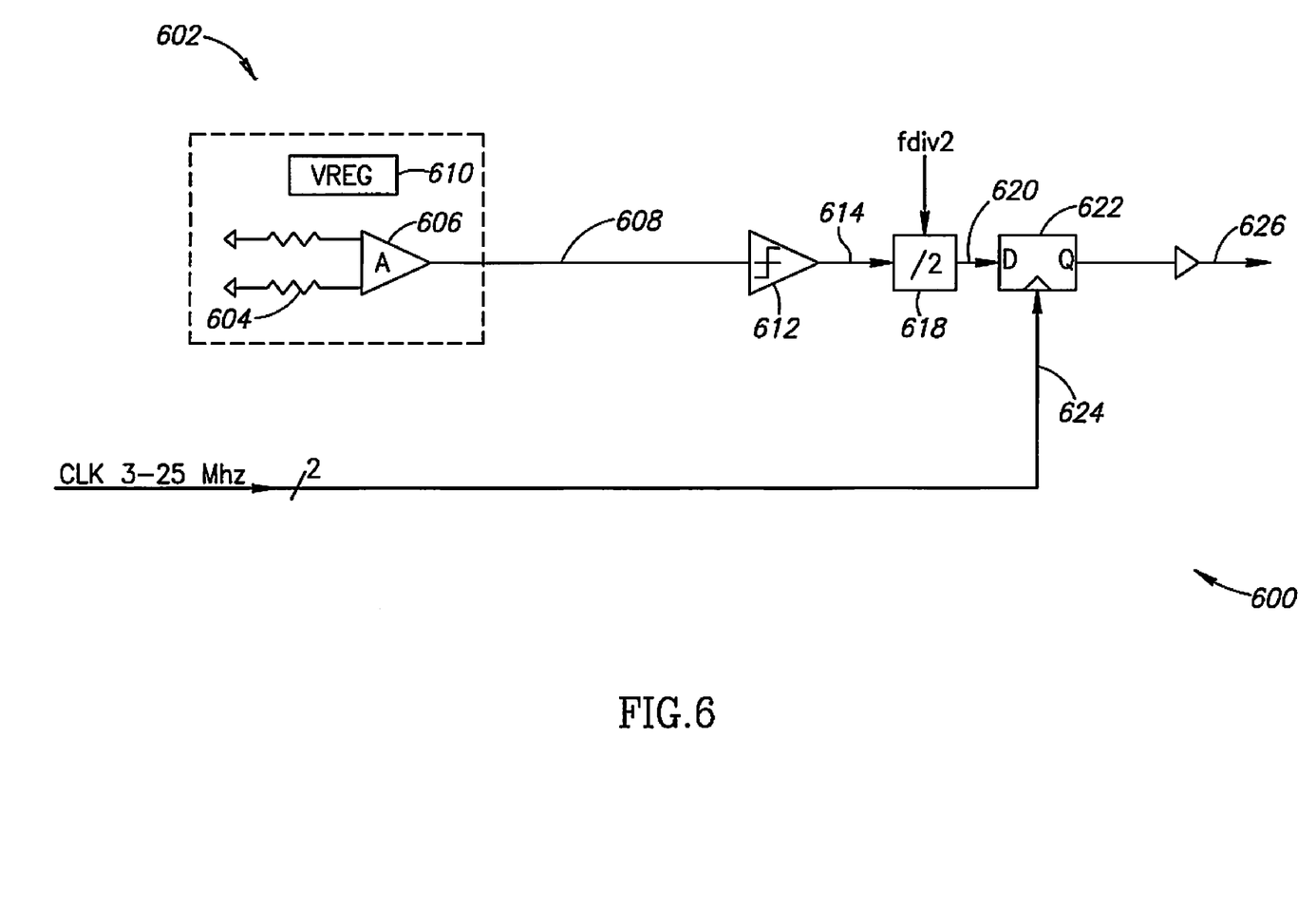
FIG. 6 is a schematic illustration of a RNG module in accordance with yet another demonstrative embodiment of the invention.

Reference is now made to FIG. 6, which schematically illustrates a RNG module 600 adapted to generate random bits at a bit path 626 according to yet another demonstrative embodiment of the invention. Although the invention is not limited in this respect RNG module 600 may perform the functionality of RNG module 208 (FIG. 2). For example, bit path 220 (FIG. 2) may include bit path 626.

According to some demonstrative embodiments of the invention, RNG module 600 may include an active thermal noise source 602 to generate a noise signal 608. Noise source 602 may include any suitable active thermal noise source, e.g., as is known in the art. In one example, noise source 602 may include a thermal noise source 604, e.g., including a MOS arrangement, to generate a thermal noise signal, as is known in the art; and an amplifier 606 to amplify the thermal noise signal, e.g., as is known in the art.

According to some demonstrative embodiments of the invention, RNG module 600 may also include a voltage comparator 612 adapted to convert noise signal 608 into a binary sequence. Comparator 612 may include any suitable voltage comparator, e.g., as is known in the art. RNG module 600 may also include a divider by two 618 to divide a frequency of an output 614 of comparator 612 by two, e.g., in order to balance zeros and ones in output 626.

According to some demonstrative embodiments of the invention, RNG module 600 may also include a flip-flop 622 to generate random bits at bit path 626 based on an output 620 of divider 618 and a clock signal 624.

According to some demonstrative embodiments of the invention, RNG module 600 may include an independent VREG 610. VREG 610 may include any suitable VREG, for example, an on-chip bandgap reference based VREG, e.g., having a predefined PSRR as is known in the art. It will be appreciated, that VREGs 610 may reduce the affect of on-chip cyclostationary noise and/or external modulations on the operation of RNG 600.

Referring back to FIG. 2, the operation of RNG modules 202, 204, 206 and 208 may be affected by operational conditions, to which RNG 200 may be subject. The operational conditions may include, for example, voltage variations, temperature variations and/or process variations (collectively referred to as "PVT variations"), as are known in the art. In some operational conditions one or more of the thermal noise source, chaotic noise source, spectrum spreader, and comparator may fail or have degraded functionality.

As described above, according to some demonstrative embodiments of the invention, each of RNG modules 202, 204, 206 and 208 may include a different arrangement of at least one noise source, a spectrum spreader, and/or a comparator. Accordingly, each of RNG modules 202, 204, 206 and 208 may be adapted to have a different profile of sensitivity to the operational conditions.

At some operation conditions at least one of RNG modules 202, 204, 206 and 208 may not operate properly to generate random bits over at least one of bit paths 210, 212, 214, 216, 218 and/or 220. However, it will be appreciated by those skilled in the art, that combiner 222 may provide the random bits at path 224, e.g., even if one or more of RNG modules 202, 204, 206 and 208 does not operate properly. For example, in some operational conditions the chaotic noise source may fail, while the thermal noise source, spectrum spreader, and/or comparator may operate properly. According to this example, RNG 200 may generate random bits at least at paths 218 and 220; and bit path 224 may include bits resulting from a combination of the bits of paths 218 and 220.

It will be appreciated by those of ordinary skill in the art that the random bits generated by RNG 200, e.g., at output 282, may have improved statistical properties, e.g., entropy, mixing, autocorrelation, and/or 0-1 ratio, compared, for example, to the statistical properties of conventional RNGs implementing a single bit path.

Table 1 includes results of a simulation of the functionality of RNG modules 202, 204, 206, and 208 under a plurality of operational situations ("corners") representing a combination of operational conditions, in accordance with some demonstrative embodiments of the invention. It should be noted that the information used in this simulation has been selected for demonstrative purposes only and is not intended to limit the scope of the invention.

TABLE 1

| Corner # | Chaotic noise source | Active thermal noise source | Spreader | Comparator | Number of functional paths |
|---|---|---|---|---|---|
| 1 | Pass | Pass | Pass | Pass | 6 |
| 2 | Pass | F | X | Pass | 3 |
| 3 | Pass | X | F | Pass | 2 |
| 4 | Pass | F | Pass | F | 6 |
| 5 | Pass | F | Pass | Pass | 6 |
| 6 | F | Pass | Pass | Pass | 6 |
| 7 | F | Pass | X | Pass | 3 |

In Table 1, each of the corners represents a different combination of process, supply voltage, and temperature conditions resulting in each of the chaotic noise source, active thermal noise source, spectrum spreader, and comparator either performing properly (denoted "PASS"), e.g., compared to a predefined specification ("the spec"); having a degraded performance (denoted "F"), e.g., compared to the spec; or failing (denoted "X"). The column entitled "number of functional paths" includes a value representing a number of functional bit paths at a corresponding "corner". As shown in Table 1, the combination of modules 202, 204, 206 and 208 according to the embodiments described above with reference to FIG. 2, may be adapted to generate at least two functional bit paths in each one of the corners.

Following are demonstrative behavioral models of the active thermal noise source, chaotic noise source, spectrum spreader, and voltage comparator, which may be implemented as part of the simulation, according to some demonstrative embodiments of the invention. It should be noted that these behavioral models are not intended to limit the scope of the invention, and that any other suitable model may be used.

According to some demonstrative embodiments of the invention, a voltage output, denoted $V_{amp}$, of an active thermal noise source, e.g., noise signal 309 (FIG. 3), 509 (FIG. 5), and/or 608 (FIG. 6), may be modeled as follows:

$$V_{amp} = 4 \cdot k \cdot T \cdot R \cdot BW_{namp} \cdot G_{namp} + Vos_{namp} \tag{1}$$

wherein k denotes Boltzmann's Constant, i.e., k=1.38E-23 J/K; T denotes a temperature, e.g., T=298 Kelvin (K); R denotes a resistance of an input resistor of the active thermal noise source; $BW_{namp}$ denotes a noise bandwidth; $G_{namp}$ denotes an amplification gain; and $Vos_{namp}$ denotes an output offset voltage.

According to some demonstrative embodiments of the invention, a state, denoted $x_{n+1}$ of a chaotic noise source may be modeled as follows:

$$x_{n+1} = B_L \cdot (x_n + \epsilon_{os}) + A \cdot \text{sign}(x_n + \epsilon_{os}) \tag{2}$$

wherein $x_n$ denotes a previous state of the chaotic noise source; $B_L$ denotes a gain of the chaotic noise source, e.g., $B_L=2.00$; A denotes an elevation constant, e.g., A=1.00; and $\epsilon_{os}$ denotes an offset error.

According to some demonstrative embodiments of the invention, a VCO may be modeled as follows:

$$F_{vco} = F_{min} + V_{ctl} * (F_{max} - F_{min}) \tag{3}$$

$$V_{vco} = \sin(2\pi F_{vco} t_k) \tag{4}$$

wherein $F_{vco}$ denotes an actual frequency, $F_{min}$ denotes a minimal VCO frequency, $F_{max}$ denotes a maximal VCO frequency, $V_{ctl}$ denotes a VCO control voltage, $V_{vco}$ denotes a VCO output voltage, and $t_k$ denotes a sampling time.

According to some demonstrative embodiments of the invention, an output, denoted $d_{out}$ of a voltage comparator, e.g., output 614 (FIG. 6), may be modeled as follows:

$$d_{out} = V_{in} > V_{offset} \quad (5)$$

wherein $V_{in}$ denotes an input voltage of the comparator, and $V_{offset}$ denotes an offset voltage of the comparator.

According to some demonstrative embodiments of the invention, the following values may be used with the behavioral model described above:

chaotic noise source:
1.8<B<1.999
comparator:
$V_{offset}$<20 millivolt (mV)
thermal noise source:
$V_{peak\ to\ peak}$>20 mV
$BW_{namp}$>30 MegaHertz (Mhz)
VCO:
$F_{min}$>300 Mhz
$F_{ratio} = F_{max}/F_{min}$>1.6

According to some demonstrative embodiments of the invention a VREG, e.g., VREG 303 (FIG. 3), 362 (FIG. 3), 312 (FIG. 3), 404 (FIG. 4), 436 (FIG. 4), 504 (FIG. 5), 512 (FIG. 5), and/or 610 (FIG. 6), may be characterized as follows:

$VREG_{out}$ in the range of [0.99–121]±10%
PSRR<−20 dB

Figure 7:
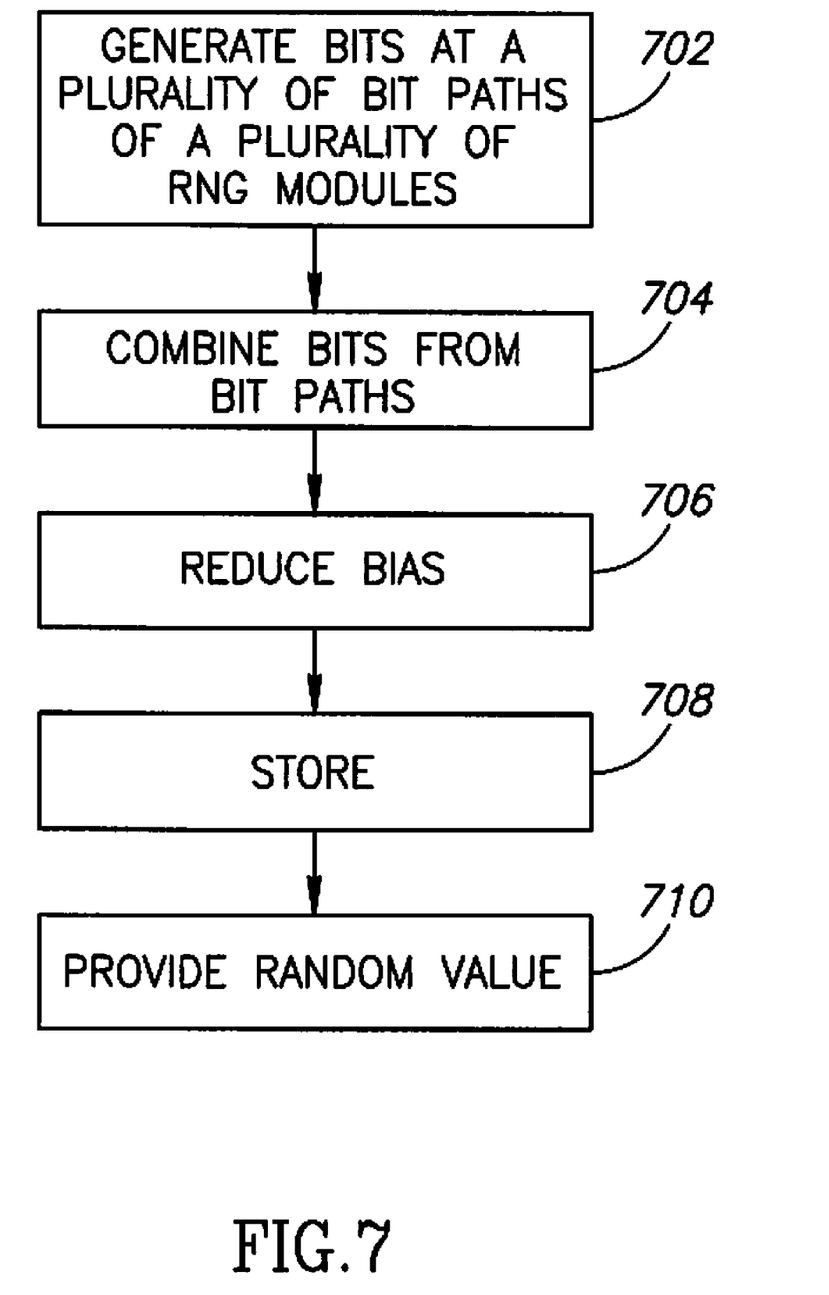

Reference is now made to FIG. 7, which schematically illustrates a method of generating a random value. Although the invention is not limited in this respect, one or more operations of the method of FIG. 7 may be implemented by a RNG, e.g., RNG 102 (FIG. 1), and/or one or more RNG modules, e.g., RNG modules 202, 204, 206 and/or 208 (FIG. 2), to generate a random value, e.g., one or more random bits.

As indicated at block 702, the method may include generating bits at a plurality of bit paths of a plurality of RNG modules. Generating the bits may include generating the bits at the plurality of RNG modules, wherein each of the plurality of RNG modules generates bits at least one of the plurality of bit paths, e.g., independently of the other RNG modules. For example, RNG modules 202, 204, 206 and/or 208 (FIG. 2) may generate bits at bit paths 210, 212, 214, 216, 218 and/or 220 (FIG. 2).

As indicated at block 704, the method may also include combining bits of the plurality of bit paths, e.g., to generate one or more bits at a combined path. For example, combiner 222 (FIG. 2) may combine bits of one or more of paths 210, 212, 214, 216, 218 and/or 220 (FIG. 2) to generate bits at path 224 (FIG. 2).

As indicated at block 706, the method may also include reducing the bias of the bits at the combined path. Reducing the bias of the bits at the combined path may include, for example, using a bias reducer, e.g., bias reducer 226 (FIG. 2).

As indicated at block 708, the method may also include storing one or more of the bits. Storing the bits may include, for example, using a storage, e.g., storage 230 (FIG. 2).

As indicated at block 710, the method may also include generating a random value, e.g., number. Generating the random value may include, for example, providing one or more bits of storage 230 (FIG. 2) at output 282 (FIG. 2).

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A random number generator comprising:
a plurality of different random-number-generation modules adapted to generate random bits at a plurality of bit paths;
at least one random number generation module comprising:
a thermal noise source operative to generate a noise signal;
a spectrum spreader operative to spread a spectrum of said noise signal;
a random bit generator operative to generate one of said bit paths based on the output of said spectrum spreader; and
a combiner adapted to combine the bits of said plurality of paths.

2. The random number generator of claim 1, wherein each of said plurality of modules generates bits of at least one of said plurality of bit paths independently of other modules.

3. The random number generator of claim 1, wherein said plurality of modules comprises a plurality of noise sources.

4. The random number generator of claim 3, wherein said plurality of noise sources comprise at least one analog noise source.

5. The random number generator of claim 1, wherein at least one of said plurality of modules includes two different noise sources.

6. The random number generator of claim 1, wherein at least one module of said plurality of modules is adapted to generate random bits at first and second random bit paths of said plurality of bit paths.

7. The random number generator of claim 6, wherein said module comprises:
a chaotic noise source to generate first and second noise signals; and
a spectrum spreader to spread a spectrum of said first noise signal,
wherein the bits of said first and second paths are based on said second noise signal and an output of said spreader, respectively.

8. The random number generator of claim 7, wherein said module comprises an active thermal noise source to provide a noise signal to an input of said chaotic noise source.

9. The random number generator of claim 7, wherein said module comprises a passive thermal noise source to provide a noise signal to an input of said chaotic noise source.

10. The random number generator of claim 1, wherein at least one module of said plurality of modules is adapted to generate random bits at a path of said plurality of bit paths, said module comprises:
an active thermal noise source to generate a noise signal; and
a spectrum spreader to spread a spectrum of said noise signal,
wherein the bits of said path are based on an output of said spreader.

11. The random number generator of claim 1, wherein at least one module of said plurality of modules is adapted to generate random bits at a path of said plurality of bit paths, said module comprises:
an active thermal noise source to generate a noise signal; and
a voltage comparator to convert said noise signal into a binary sequence,
wherein the bits of said path are based on said binary sequence.

12. The random number generator of claim 1, wherein at least one of said plurality of modules includes an independent voltage regulator.

13. The random number generator of claim 1, wherein said combiner comprises an exclusive-or gate.

14. A method of generating a random number, the method comprising:
   generating bits at a plurality of bit paths of a plurality of random-number-generation modules;
   wherein generating bits at at least one random number generation module comprises:
      generating a noise signal from a thermal noise source;
      spreading a spectrum of said noise signal utilizing a spectrum spreader;
      generating one of said bit paths based on the output of said spectrum spreader; and
   combining bits of said plurality of bit paths.

15. The method of claim 14, wherein combining the bits of said plurality of bit paths comprises generating one or more bits at a combined path based on the bits of said plurality of bit paths, and wherein said method comprises generating said random value based on the bits of said combined path.

16. The method of claim 14, wherein generating the bits at said plurality of bit paths comprises using each of said plurality of modules to generate bits at at least one of the plurality of bit paths independently of other modules.

17. The method of claim 14, wherein generating the bits at said plurality of bit paths comprises using at least one module of said plurality of modules to generate random bits at first and second random bit paths of said plurality of bit paths.

18. A chip comprising:
   a random number generator to generate an output value, said random number generator comprising:
      a plurality of different random-number-generation modules adapted to generate random bits at a plurality of bit paths;
   at least one random number generation module comprising:
      a thermal noise source operative to generate a noise signal;
      a spectrum spreader operative to spread a spectrum of said noise signal;
      a random bit generator operative to generate one of said bit paths based on the output of said spectrum spreader;
      a combiner adapted to combine the bits of said plurality of paths, wherein said output value is based on an output of said combiner; and
   a processor to process said random value.

19. The chip of claim 18, wherein each of said plurality of modules generates bits of at least one of said plurality of bit paths independently of other modules.

20. The chip of claim 18, wherein at least one of said plurality of modules includes two different noise sources.

* * * * *